Oct. 15, 1935.  J. BROWN  2,017,232
FILTER
Filed March 12, 1934
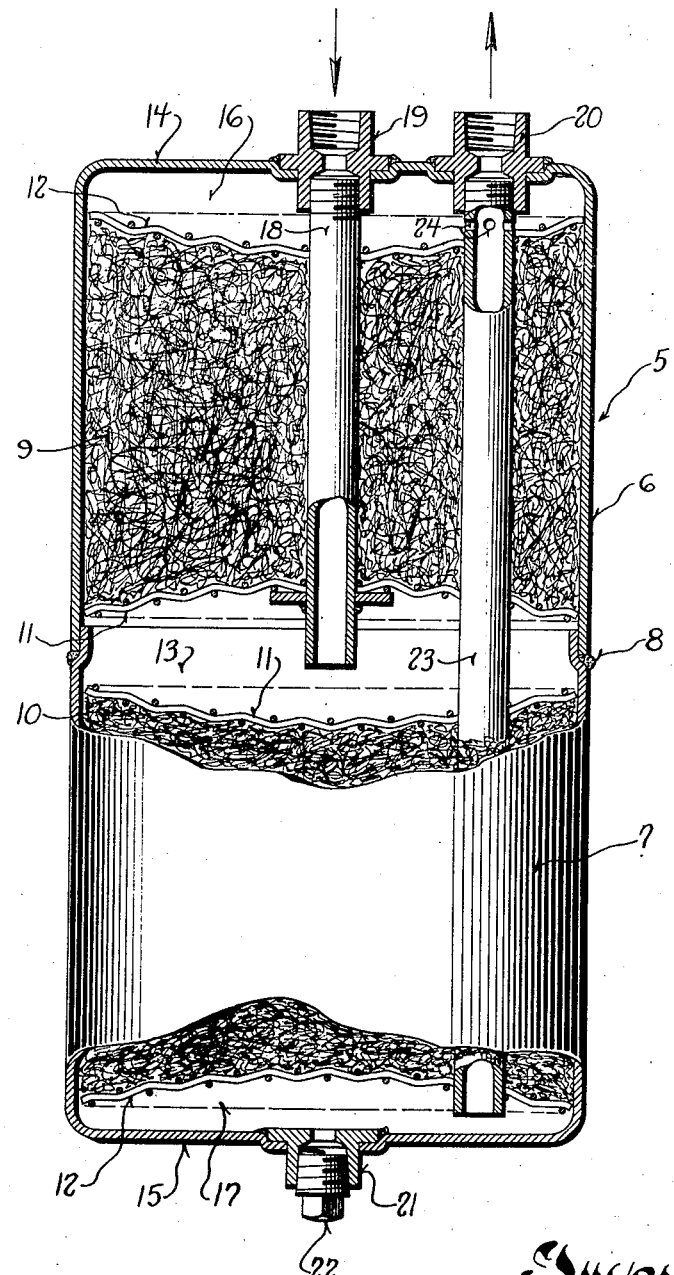
Inventor
Jerome Brown Patented Oct. 15, 1935

2,017,232

UNITED STATES PATENT OFFICE 2,017,232

FILTER

Jerome Brown, Milwaukee, Wis., assignor to Briggs & Stratton Corporation, Milwaukee, Wis., a corporation of Delaware Application March 12, 1934, Serial No. 715,131

2 Claims. (Cl. 210—131)

This invention relates to new and useful improvements in filters and refers more particularly to oil filters for use with internal combustion engines of automotive vehicles, of the type shown and described in Patent No. 1,934,251, issued to H. D. Austin, November 7, 1933, and has as an object to provide a filter of compact construction, and increased capacity.

More specifically, it is an object of this invention to provide a filter having two filter units disposed in parallel with means whereby the lubricant to be filtered passes simultaneously through both units to thus increase the capacity of the filter without materially increasing the overall size of the device and without in anywise complicating its design.

With the above and other objects in view which will appear as the description proceeds, my invention resides in the novel construction, combination and arrangement of parts substantially as hereinafter described and more particularly defined by the appended claims, it being understood that such changes in the precise embodiment of the hereindisclosed invention may be made as come within the scope of the claims.

In the accompanying drawing, I have illustrated one complete example of the physical embodiment of my invention constructed according to the best mode I have so far devised for the practical application of the principles thereof, and in which:

The single view is a view partly in side elevation and partly in vertical section taken through a filter device embodying this invention.

Referring now more particularly to the accompanying drawing, in which like numerals indicate like parts, the numeral 5 designates the casing of the filter device, which in the present instance, consists of upper and lower cup-shaped units 6 and 7 arranged end to end, with their meeting edges secured together as at 8.

Disposed within the upper and lower casing sections 6 and 7 are filter units 9 and 10, respectively. These filter units are identical in construction and comprise batches of loosely carded animal wool confined between inner screens 11 and outer screens 12. The screens 11 and 12 serve to maintain the batches of wool which comprise the filter units separate from each other to define a central space or chamber 13, and spaced from the casing top and bottom walls 14 and 15 respectively to define upper and lower spaces or chambers 16 and 17 respectively.

To conduct the liquid to be filtered to the central space 13, a duct 18 extends through the upper filter unit 9 with its lower end in open communication with the central space 13 and its upper end fixed in a nipple 19 which is carried by the top wall 14 and provides an inlet connection.

Liquid conducted to the central space 13 is forced upwardly and downwardly through the filter units 9 and 10 compressing the same so as to effect a piston action similar to that obtained in the aforementioned patent to H. D. Austin No. 1,934,251, the filtered lubricant flowing out into the upper and lower chambers or spaces 16 and 17.

From these upper and lower or end chambers, the filtered lubricant is conducted from the casing either through an oulet 20, or an outlet 21. The outlet 20 is provided by a nipple similar to the nipple 19 and is secured to the top wall 14, and the outlet 21 is afforded by a nipple fixed to the bottom wall 15. Obviously, only one of the two outlets is used at one time, and in the present embodiment, the lower outlet 21 is closed by a removable plug 22.

Extending downwardly from the nipple providing the outlet 20 is a duct 23. The lower end of this duct is in open communication with the bottom chamber or space 17 and the upper end thereof is provided with perforations 24 to communicate the same with the upper space or chamber 16 so that both end spaces 16 and 17 are connected with both outlets.

From the foregoing description taken in connection with the accompanying drawing, it will be readily apparent to those skilled in the art, that this invention affords a filter of exceptionally compact construction and comparatively large capacity.

What I claim as my invention is:

1. A filter of the character described comprising a substantially cylindrical casing having a cylindrical side wall and substantially flat end walls, spaced filter units disposed in the casing in superimposed relation with their adjacent portions spaced from each other to define a central space and opposite ends and spaced from the end walls of the casing to define end spaces, an inlet tube carried by one end wall of the casing and extending through one of the filter units to communicate with the central space to conduct liquid to said central space for passage simultaneously through both filter units, an outlet leading from one end space to the exterior of the casing and a duct carried by one end wall and passing through both of said filter units, said duct having communication at its opposite end portions with the end spaces whereby liquid passing through both of said filter units is conducted to said outlet.

2. A filter for internal combustion engines comprising a casing having a substantially cylindrical side wall and substantially flat end walls, two filter units comprising batches of compressible loosely carded wool disposed within said casing, screens at opposite ends of the filter units to maintain the same spaced apart to provide a central space and spaced from the ends of the casing to afford end spaces, inlet and outlet nipples carried by one end wall of the casing, a duct secured in the inlet nipple and passing through the adjacent filter unit to communicate with the central space to conduct liquid to said central space for passage simultaneously through both filter units to the end spaces, and a duct carried by the outlet nipple and passing through both of the filter units, said duct having communication with both end spaces whereby liquid filtered by both units is conducted thereby to said outlet nipple.

JEROME BROWN.